L. P. COULTER.
ARC WELDING SYSTEM.
APPLICATION FILED APR. 19, 1915.
1,290,915.
Patented Jan. 14, 1919.
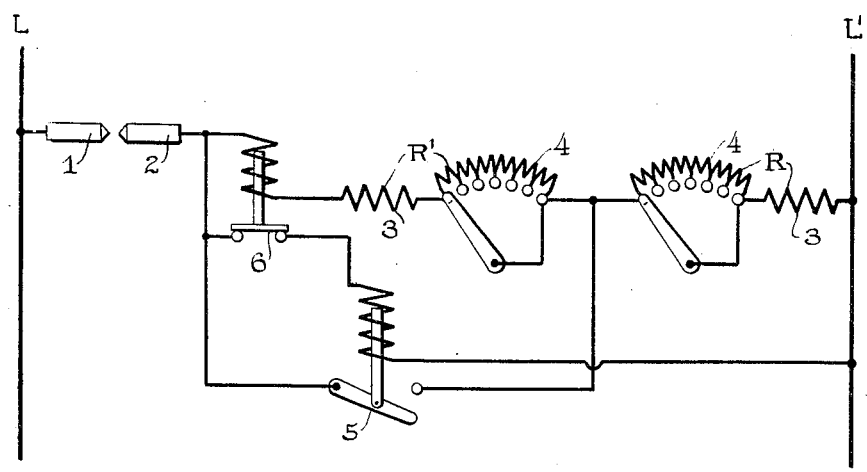
Inventor
Leonard P. Coulter
By Frank H. Hubbard
Attorney

UNITED STATES PATENT OFFICE.

LEONARD P. COULTER, OF MILWAUKEE, WISCONSIN, ASSIGNOR TO THE CUTLER-HAMMER MFG. CO., OF MILWAUKEE, WISCONSIN, A CORPORATION OF WISCONSIN.

ARC-WELDING SYSTEM.

1,290,915.     Specification of Letters Patent.     Patented Jan. 14, 1919.

Original application filed April 4, 1914, Serial No. 829,473. Divided and this application filed April 19, 1915. Serial No. 22,386.

*To all whom it may concern:*

Be it known that I, LEONARD P. COULTER, a citizen of the United States, residing at Milwaukee, in the county of Milwaukee and State of Wisconsin, have invented new and useful Improvements in Arc-Welding Systems, of which the following is a full, clear, concise, and exact description, reference being had to the accompanying drawing, forming a part of this specification.

This invention relates to improvements in electric welding systems.

In such systems, and especially arc welding systems, it is very desirable to restrict the power of the welding circuit upon initial completion thereof and to thereafter automatically increase the power when proper conditions are established for proceeding with the welding operation. Such regulation serves, among other purposes, to insure against excessive current and waste of power.

This invention has among its objects to provide a simplified system wherein provision is made for the aforesaid regulation and for insuring return of the regulating means to initial position whenever the welding circuit is interrupted.

Another object is to provide a system wherein interruption of the welding circuit positively insures disconnection of all windings of the system from the power circuit, thereby eliminating the danger incident to sticking of any of the switches of the system.

Another object is to provide a system wherein energization of a single winding serves to maintain the regulating means effective for welding.

Another object is to provide a system enabling the use of control windings of reduced capacity.

Another object is to provide a system wherein an intermittent duty winding serves to definitely time the operation of the regulating means, said winding being automatically excluded from circuit upon fulfilment of its function.

Other objects and advantages will hereinafter appear.

One embodiment of the invention is diagrammatically illustrated in the accompanying drawing, the same being one of two systems disclosed in my co-pending application, Ser. No. 829,473, filed April 4, 1914, of which the present application is a division. It should be understood, however, that the invention may be embodied in other forms without departing from the scope of the appended claims.

The system illustrated is an arc welding system and includes electrodes 1 and 2 connected respectively to supply lines L and L'. The electrodes are movable into contact to complete circuit therethrough and are thereafter separable to draw an arc therebetween. The electrode 2 is connected to line L' through two resistances R and R', each including a fixed step 3 and a variable step 4 for permitting limited adjustment thereof. The resistance R, except for the aforesaid adjustment, is permanent while the resistance R' is designed for inclusion upon completion of the electrode circuit and for exclusion when the arc is drawn to the proper degree for welding.

The regulating means includes an electro-responsive switch 5 controlling a short-circuit around the resistance R' and an electro-responsive relay switch 6 controlling the energizing circuit of the switch 5. The windings of both switches are connected in series with the electrodes and hence are directly responsive to the current of the welding circuit and subject to disconnection from circuit immediately upon interruption of the welding circuit. This insures against the circuit of either winding being maintained after interruption of the welding circuit. Switch 5 normally interrupts the short-circuit around the resistance R' and must be energized to close the same. Thus, the resistance R' is normally included in circuit and when excluded its reinsertion is insured by interruption of the welding circuit. Relay switch 6 normally stands in closed position to complete circuit between the electrode 2 and the winding of switch 5 and is responsive to open said circuit thereby rendering switch 5 temporarily inoperative. The adjustment of the switches 5 and 6 is such as to provide a time element to permit response of the latter in advance of the former and said relay switch is adjusted to release at a definite current value. Preferably the switch 6 is adjusted to release at the current value prevailing at the instant the arc is drawn to the proper length for welding and preferably the winding of said switch is arranged to be short-circuited by the switch 5 upon responding. The relay is thereby relieved from continuous duty with a consequent permissible reduction in the capacity of its winding.

More specifically describing the connections and functions of the system, it will be assumed that contact is made between the electrodes with the switches in the positions illustrated. This completes circuit from line L through the electrodes and thence by two parallel branches to line L'. One branch extends through the winding of relay switch 6 and thence through both resistances R and R' while the other branch extends through the winding of switch 5. Thus at the instant of contact between the electrodes both switches tend to respond but the relay switch 6 being quicker acting responds to interrupt the circuit of switch 5 before the latter is able to respond. Thus resistance R is maintained in circuit until the relay switch is released. Relay switch 6, however, will remain open until the electrodes are separated to draw the welding arc and until the resistance of such arc reduces the current of the electrode circuit to the value at which said switch is set to release. When the relay switch releases, it recloses the branch of the electrode circuit including the winding of switch 5 which thereupon responds to complete circuit directly from the electrode 2, to and through resistance R to line L'. This effects the proper electrical adjustment for welding and at the same time excludes from circuit the winding of relay switch 6.

Thus switch 5 alone serves to maintain working conditions until the power of the welding circuit fails either by intentional interruption of circuit, or otherwise, in which event said switch is released to remove the short-circuit from resistance R' and the winding of switch 6. Starting conditions are thereby automatically reëstablished.

What I claim as new and desire to secure by Letters Patent is:

1. In a welding system, in combination, welding electrodes, power restricting means therefor, an electro-responsive controller adapted when deënergized to render said means effective and responsive to render the same ineffective and power connections including series connections for said electrodes and said controller whereby the latter is subjected to variations in the current of the electrode circuit and is deënergized upon failure of current in said circuit, said controller being set to respond only when the current in the electrode circuit is within a predetermined maximum limit.

2. In a welding system, in combination, welding electrodes, power connections therefor, a power controller for the electrode circuit biased to a position to act restrictively and electro-responsive means connected in series with said electrodes to operate said controller automatically after closure of the electrode circuit but subject to delay while the current of the electrode circuit exceeds a predetermined value.

3. In a welding system, in combination, electrodes, a power circuit therefor, a resistance normally included in said circuit, electro-responsive means for excluding said resistance from circuit automatically after closure of said circuit, said means being connected so that its circuit will be broken directly by the interruption of said power circuit to reinsert said resistance and electro-responsive means connected in series with said electrodes to be thereby directly subjected to variations in the current of the electrode circuit, said last-mentioned means governing the former means to insure against response thereof while the current of the electrode circuit exceeds a predetermined value.

4. In a welding system, in combination, welding electrodes, an electro-responsive power controller therefor, an electro-responsive governing device for said controller and power connections for said electrodes including the windings of said controller and governing device in series therewith.

5. In a welding system, in combination, welding electrodes, a resistance therefor, an electro-responsive controller for said resistance, an electro-responsive governing device for said controller and power connections for said electrodes having parallel branches both in series with the electrodes and one including said resistance and the winding of said governing device and the other including the winding of said resistance controlling device.

6. In a welding system, in combination, welding electrodes, a resistance therefor, an electro-responsive controller for said resistance, an electro-responsive governing device for said controller, power connections for said electrodes having parallel branches both in series with the electrodes and one including said resistance and the winding of said governing device and the other including the winding of said resistance controlling device and connections established by said controller upon responding to short-circuit said resistance and the winding of said governing device.

7. A welding controller comprising electrodes, a resistance in series with said electrodes, a normally open switch adapted, when closed, to short circuit said resistance, said switch having a winding in series with said electrodes and means for energizing said winding only when the welding current falls below a critical value.

8. In a welding system, in combination, welding electrodes, power connections therefor, a power controller for said electrodes having an operating winding and a timing winding, both of said windings being connected in series with said electrodes, and a shunt circuit for said timing winding completed by said power controlling means upon response thereof.

9. In a welding system, in combination, welding electrodes, power connections therefor and power controlling means having an operating winding and a timing winding, both of said windings being connected in series with said electrodes.

In witness whereof, I have hereunto subscribed my name.

LEONARD P. COULTER.